March 10, 1925.  1,528,757

M. CLODFELTER

SPRING WHEEL

Filed May 12, 1924  2 Sheets-Sheet 1

Inventor

Mays Clodfelter

March 10, 1925.

M. CLODFELTER

SPRING WHEEL

Filed May 12, 1924

1,528,757

2 Sheets-Sheet 2

Inventor

Mayo Clodfelter

Patented Mar. 10, 1925.

1,528,757

UNITED STATES PATENT OFFICE.

MAYO CLODFELTER, OF CHICAGO, ILLINOIS.

SPRING WHEEL.

Application filed May 12, 1924. Serial No. 712,833.

*To all whom it may concern:*

Be it known that I, MAYO CLODFELTER, a citizen of the United States, residing at Chicago, in the county of Cook and State of Illinois, have invented certain new and useful Improvements in a Spring Wheel, of which the following is a specification.

This invention relates to improvements in spring wheels for vehicles.

An important object of the invention is to provide a vehicle wheel of great resiliency to afford easy riding of vehicles.

A further object of the invention is the provision of a wheel of this character which will absorb shocks and vibration to which vehicles are subjected and consequently prolong the life of the vehicle and tires.

A still further object of the invention is to provide a wheel of this character which is comparatively simple in construction, very durable and efficient for this purpose.

Other objects and advantages of this invention will be apparent during the course of the following description.

Figure 1:
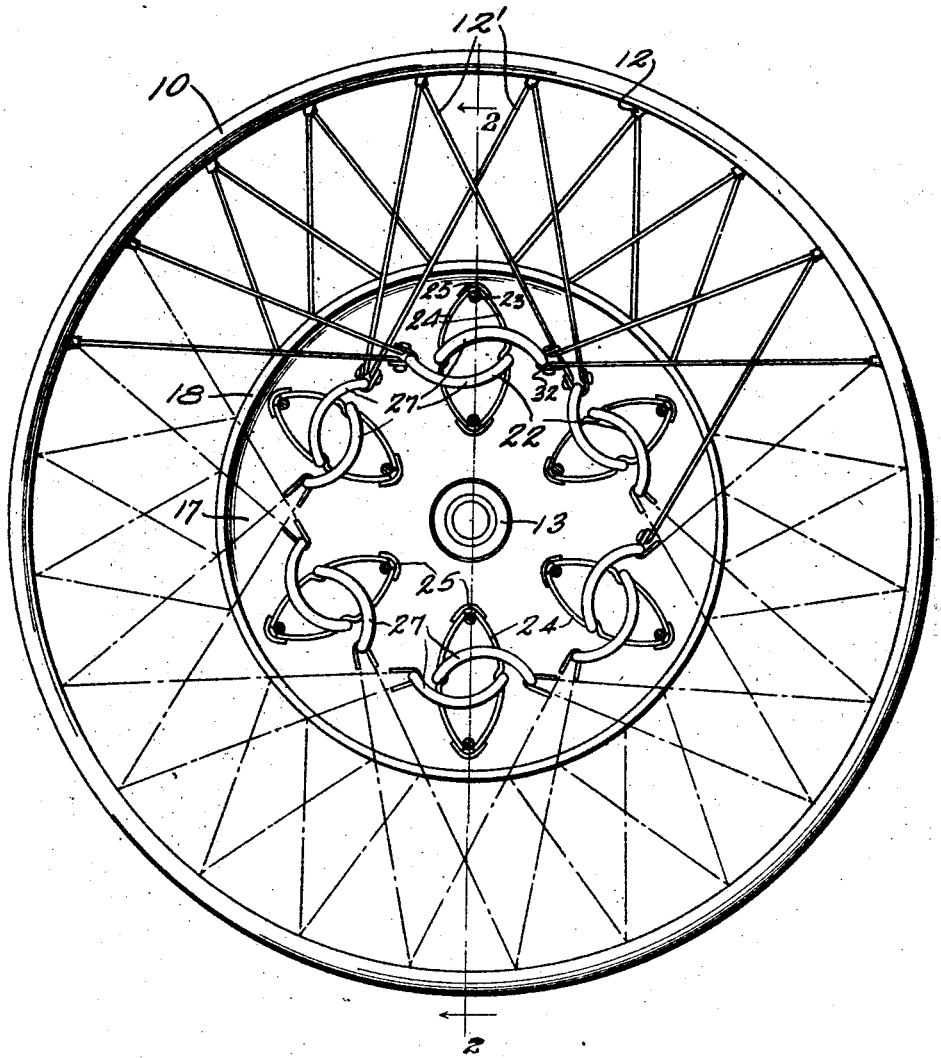
Figure 2:
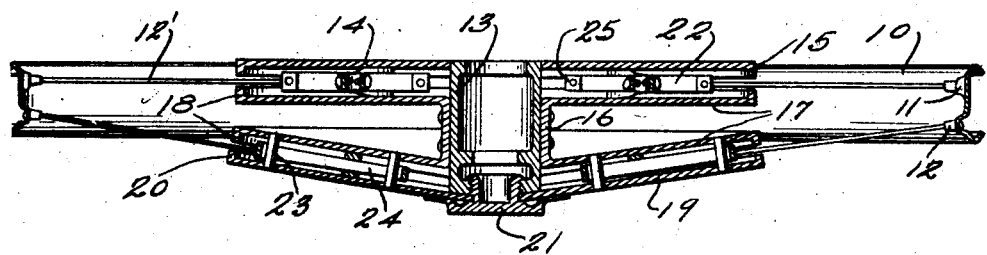
Figure 3:
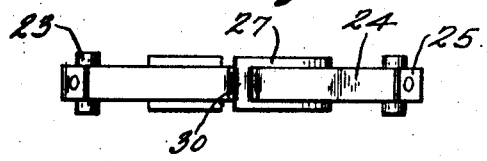
Figure 5:
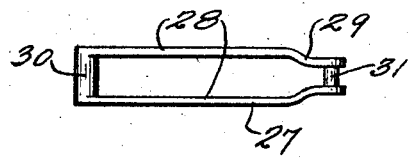
Figure 4:
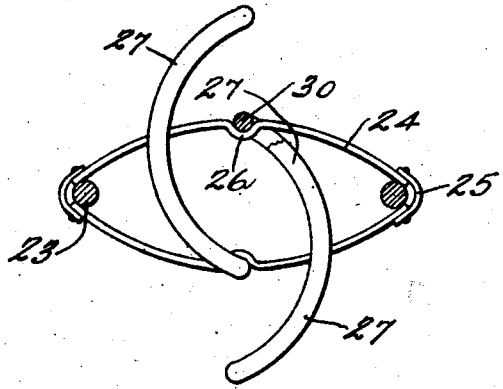
Figure 6:
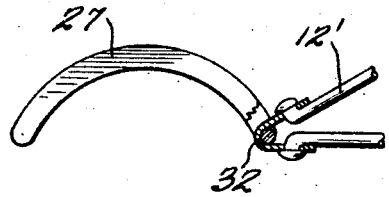

In the acompanying drawings, forming a part of this specification and in which like numerals are employed to designate like parts throughout the same:

Figure 1 is a side elevation of my improved device, one of the hub plates being removed to show the interior construction, Figure 2 is a transverse sectional view taken on the line 2—2 of Figure 1, Figure 3 is a plan view of one of the spring mechanisms, Figure 4 is a side elevation of the same, Figure 5 is a plan view of one of the detail parts, and Figure 6 is a side elevation showing the spoke connection.

In the drawings, wherein for the purpose of illustration is shown the preferred embodiment of my invention, the numeral 10 generally indicates the wheel rim which in this instance is specifically shown as adapted to receive an automobile tire. A plurality of pockets are formed at spaced intervals about the rim 10 as shown at 11 permitting the mounting of spoke engaging caps 12.

The central portion of the wheel comprises a conventional type of hub 13 having mounted thereon an inner flange plate 14 circular in form and having a flange 15 formed upon the outer periphery thereof. A central assembly 16 consisting of a pair of circular plates 17 having similar flanges 18 formed upon the outer periphery thereof is secured to the central portion of the hub by rivets or the like. An angular plate 19 concave in form is of similar construction and is provided with the peripheral flange 20, the plate 19 being secured to the hub by means of a screw cap 21. The pairs of co-acting plates form housings for a plurality of co-acting spring units 22, six of these units being employed in each section as shown in the drawings, although I do not desire to restrict the application of my device to the particular number of spring units shown.

Each unit comprises a pair of transverse supporting pins 23 securely fastened in the co-acting plates supporting a pair of arcuate spring steel bars 24 held in position by a pair of clips 25 riveted or otherwise secured to the extremities of the spring bars 24, the central portions of the spring bars are bent inwardly as at 26 to form grooves adapted to engage the extremities of arcuate retaining clamps 27.

The arcuate retaining clamps 27 are formed of a pair of side bars 28 curved inwardly at the extremities as shown at 29 and provided with cross shafts 30 and 31 at the extremities. The longer shaft 30 is fitted within the grooves formed in the spring bars while the comparatively short cross shaft 31 engages a spoke engaging clip 32 bent about the shaft and adapted to secure the spokes. A plurality of wire spokes 12' or spokes of similar construction are secured to the wheel rim and the spoke retaining clips 32 mounted upon the retaining clamp 27 forming a durable and resilient structure. As clearly shown in Figure 1 each arcuate clamp 27 is connected with the central portion of the spring bars 24 and carries a spring clip to which I secure a pair of spokes extending to the rim of the wheel. Each of the several spring units comprises a pair of co-acting spring bars 24 and a similar number of arcuate clamps 27 the connecting spokes extending substantially in opposite directions and neutralizing the spring action in the normal position of the wheel. As the wheel encounters uneven surfaces of the road the shock imparted to the rim is greatly absorbed by the action of the spring bars which take up the greater part of the shock by expansion of the resilient spring units. The use of wire spokes is also considered desirable as this feature will also greatly assist in absorbing the shock imparted to the wheel rim and relieve the axle from the strain incident to such jarring.

It is to be understood that the form of my invention herewith shown and described is to be taken as the preferred example of the same, and that various changes as to the shape, size and arrangement of parts may be resorted to without departing from the spirit of the invention, or the scope of the subjoined claims.

Having thus described my invention, I claim:

1. A spring wheel of the character described comprising a rim, a hub, a plurality of plates mounted upon the said hub, a plurality of supporting pins mounted between pairs of the said plates, co-acting pairs of spring bars mounted on the said pins, a plurality of spokes secured to the rim member, a plurality of arcuate clamps engaging the spring bars and secured to the inner extremities of the spokes.

2. A spring wheel comprising a rim, spoke engaging means formed about the said rim, a plurality of spokes secured to the rim and extending inwardly, a hub mounted in the central portion of the said wheel, a plurality of flanged plates mounted upon the said hub, a plurality of cross pins securely mounted between pairs of the said plates, pairs of co-acting spring bars positioned about the said pins, a plurality of arcuate retaining clamps adapted to engage the spring bars, and a plurality of clips adapted to secure the inner extremities of the spokes to the retaining clamps.

3. A spring wheel comprising an outer rim, a plurality of projections formed upon the said rim, a plurality of spoke engaging sleeves secured to the projections in the said rim, and a plurality of spokes secured to the said retaining sleeves; a hub mounted in the central portion of the said wheel, an inner flange plate secured to the said hub, a pair of similar flange plates mounted on the central portion of the said hub, and an outer flange plate secured to the outer portion of the said hub; a plurality of supporting pins securely mounted within the co-acting flange plates, a plurality of spring units comprising pairs of co-acting spring bars mounted upon the said pins, means for retaining the said bars in position, pairs of arcuate retaining clamps engaging the central portion of the spring bars and extending outwardly therefrom, U-shaped clips positioned about the extremities of the retaining clamps, and means for securing the inner extremities of the spokes to the said U-shaped clips.

In testimony whereof, I have affixed my signature in the presence of two witnesses

MAYO CLODFELTER.

Witnesses:
C. A. LAMBERT,
M. J. CASEY.